United States Patent [19]

Reynolds

[11] Patent Number: 4,723,084

[45] Date of Patent: Feb. 2, 1988

[54] LIGHT CONDUCTOR BRUSH WEAR DETECTOR ASSEMBLY

[75] Inventor: Kenneth R. Reynolds, Erie, Pa.

[73] Assignee: General Electric Company, New York, N.Y.

[21] Appl. No.: 930,287

[22] Filed: Nov. 13, 1986

[51] Int. Cl.[4] ..... H02K 13/00
[52] U.S. Cl. ..... 310/247; 310/242
[58] Field of Search ..... 310/238–249

[56] References Cited

U.S. PATENT DOCUMENTS

| | | | |
|---|---|---|---|
| 2,900,540 | 8/1959 | Gartner et al. | 310/246 |
| 4,170,731 | 10/1979 | Howell et al. | 250/227 |
| 4,184,145 | 1/1980 | Fima | 340/52 |
| 4,315,147 | 2/1982 | Harmer | 250/221 |
| 4,344,009 | 8/1982 | Reynolds | 310/242 |
| 4,348,608 | 9/1982 | Michael | 310/242 |
| 4,480,184 | 10/1984 | Ely | 250/216 |
| 4,488,078 | 12/1984 | Orton | 310/242 |
| 4,502,823 | 3/1985 | Wronski et al. | 409/134 |
| 4,567,414 | 1/1986 | Berings | 310/243 X |

FOREIGN PATENT DOCUMENTS

| | | | |
|---|---|---|---|
| 0101549 | 6/1982 | Japan | 310/247 |

*Primary Examiner*—Mark O. Budd
*Attorney, Agent, or Firm*—Arnold E. Renner

[57] ABSTRACT

A brush wear detector assembly for the brushes contacting the rotating commutator or slip rings of a dynamoelectric machine includes a light interruptor member located in a housing attached to the brush holder with the light interruptor being biased by a compression spring which operates to push the light interruptor against the side of the brush. The light interruptor includes an aperture, or other discontinuity, which is located adjacent the separation of a fiber optic conductor. During a usable condition of the brush, a light path is completed through the aperture between the exposed ends of the fiber optic conductor; however, for a worn condition of the brush, it is forced laterally into the brush holder behind the end of the brush causing the light path to be interrupted whereupon a signal indicative of a worn condition of the brush is generated. Alternatively, the aperture or conductor positioning could be such that at worn brush condition a light path is established.

15 Claims, 4 Drawing Figures

FIG. 1
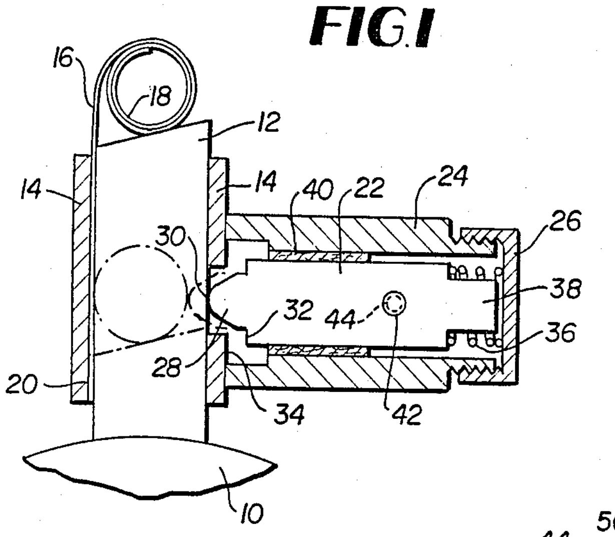
FIG. 2
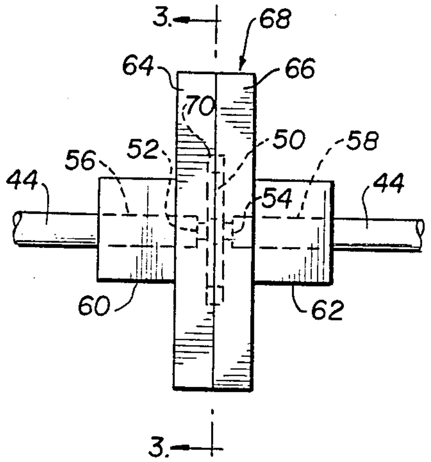
FIG. 3
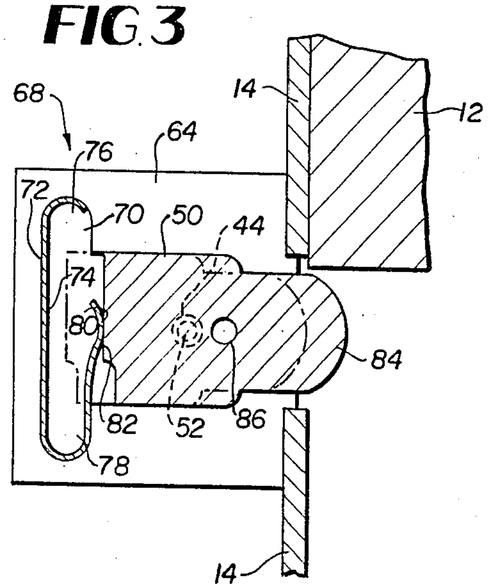
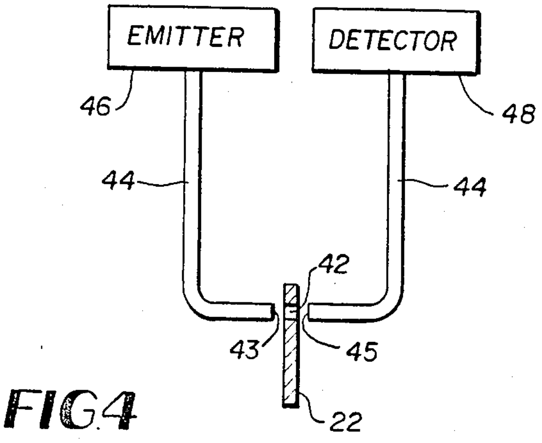
FIG. 4

LIGHT CONDUCTOR BRUSH WEAR DETECTOR ASSEMBLY

CROSS REFERENCE TO RELATED APPLICATIONS

This application is related to the following applications which are assigned to the assignee of the present invention and which are herein meant to be incorporated by reference:

U.S. Ser. No. 930,288, entitled, "Brush Wear Detector System for Multiple Brushes", filed on Nov. 13, 1986 in the name of James E. Bunner;

U.S. Ser. No. 929,891, entitled, "Light Energy Conductor Brush Wear Indicator", filed on Nov. 13, 1986 in the name of Kenneth R. Reynolds; and U.S. Ser. No. 930,286, entitled, "Brush Wear Indicator Having Variable Light Energy Conductor Path", filed on Nov. 13, 1986 in the names of James E. Bunner and Kenneth R. Reynolds.

BACKGROUND OF THE INVENTION

This invention relates generally to brush wear detectors for dynamoelectric machines and more particularly to a brush wear detector utilizing light energy conductors, commonly called fiber optics, to complete or interrupt a light path to signal the existence of a worn brush condition.

Dynamoelectric machines, such as direct current (D.C.) motors, use carbon brushes to transfer power between an external source of electric power and a rotating commutator associated with the rotor of the D.C. motor. Since the brushes are in contact with the commutator, they must be periodically replaced after a predetermined amount of wear to assure adequate current conduction and to prevent damage to the commutator. Alternating current machines may similarly employ brushes and slip rings for the transfer of electric power and have similar brush wear problems.

A variety of brush wear detectors or indicators are known for signalling the need for brush replacement. Typically, such apparatus includes electrical circuitry whose operation is dependent upon the condition of wear as sensed by the movement of a self-winding brush follower spring which applies a biasing force against the rear end of the brush and whose other end is in contact with the commutator or slip rings of a dynamoelectric machine. When the brush is in a new or usable condition, the coil of the spring is in a first position away from the commutator. As the brush wears, however, it eventually reaches a second position near the commutator. This movement is utilized to open or close a set of electrical contacts which thereby energizes or deenergizes an electrical circuit for signalling the need for brush replacement. Examples of such apparatus include the brush wear detectors disclosed in: U.S. Pat. No. 4,488,078, entitled, "Brush Wear Detector", issued to Ronald C. Orton on Dec. 11, 1984; U.S. Pat. No. 4,344,009, entitled, "Brush Wear Indicator For A Dynamoelectric Machine Brush", issued to Kenneth R. Reynolds on Aug. 10, 1982; and U.S. Pat. No. 4,348,608, entitled, "Brush Wear Indicator", issued to Richard N. Michael on Sept. 7, 1982.

A second well known type of detector system employs an electrical conductor embedded within the brush. When the brush wears by a predetermined amount, the conductor contacts the commutator (or slip ring) which may serve to complete an electric circuit or, as by wearing through a loop at the end of the conductor, break an existing circuit. In either case, a worn brush condition is indicated. These embedded conductor systems suffer from the two primary deficiencies of having an electrical current carrying member in the current carrying brush and, since the conductor is usually metallic, of a metal to metal contact with the commutator.

Accordingly, it is an object of the present invention to provide an improvement in brush wear detectors for dynamoelectric machines.

It is a further object of the invention to detect a worn brush in a dynamoelectric machine using light energy.

It is another object of the invention to provide a brush wear detector for electrical machinery such as direct current motors.

It is yet a further object of the invention to provide a brush wear detector which utilizes electrically non-conductive fiber optics to thus preclude the use of electrically conductive wires associated with other types of wear detectors, near the voltages inherently present in the brush assemblies of dynamoelectric machines.

SUMMARY OF THE INVENTION

The foregoing and other objects are achieved by a shutter member which moves in response to the length of a brush as it wears due to frictional contact with a rotating commutator, for example, to alter the light conducting state of a light path. The shutter member is biased against the side of the brush when it is of a new or an acceptable usable length. In such a position, a discontinuity such as a hole or aperture through the body of the shutter is in registration with a pair of exposed ends of a separated fiber optic conductor coupled between an optical energy emitter and detector. Upon reaching a worn condition, a compression spring urges the shutter outwardly behind the end of the worn brush, causing the optical path between the exposed ends of the fiber optic conductor to be interrupted, whereupon a worn brush condition is indicated. Alternately, the aperture in the shutter could be positioned t complete a light path in the released position of the shutter.

BRIEF DESCRIPTION OF THE DRAWING

While the present invention is defined in the claims annexed to and forming a part of the specification, a better understanding can be had by reference to the following description taken in conjunction with the accompanying drawing, in which:

FIG. 1 is a schematic side elevation, partly in section, of a brush wear detector according to a first embodiment of the invention and being illustrative of a new brush condition;

FIG. 2 is an end planar view of a second embodiment of the invention;

FIG. 3 is a sectional view taken along the lines 3—3 of FIG. 2 and is further illustrative of a worn brush condition; and FIG. 4 is a schematic diagram helpful in understanding the operation of the invention.

DESCRIPTION OF THE PREFERRED EMBODIMENTS

Referring now to the drawings and more particularly to FIG. 1, reference numeral 10 denotes the fragmentary portion of a commutator or slip ring of a dynamoelectric machine, not shown. As is well known, such a motor is comprised of two main parts, a stator assembly and a rotor assembly. The element 10 forms a part of the rotor assembly. Power transferred to the rotor is accomplished by means of a brush assembly including at least one brush 12 which is in slidable contact with the element 10. The brush is conventionally contained within a brush holder or box 14 which is secured to the stator assembly of the motor. One or more electricl leads, not shown, are normally embedded or otherwise attached to the brush to provide connection to an external power source or electrical circuit.

As shown in FIG. 1, the brush is urged or forced inwardly by a self-winding follower spring 16, whose outer end comprises a prestressed spiral coil portion 18, while its inner end 20 is fixed by being attached to a spring holder or can be directly fastened to the brush holder 14 as shown. As the brush 12 wears during use, the coil portion 18 which abuts the rear end of the brush 12, coils upon itself as shown in the phantom lines of FIG. 1.

A first embodiment of a brush wear detector in accordance with this invention is further shown in FIG. 1 and comprises a blade type shutter 22 which is slidably mounted in a housing 24 attached to the brush holder 14 and whose outer end is threaded to receive a cap 26. The shutter 22 comprises a relatively thin elongated flat body portion having a nose portion 28 whose rounded end 30 butts up against the side of a new or acceptable length brush 12. Behind the nose portion 28 there is a shoulder 32 which acts as a stop when the body portion of the shutter is urged forward against the outer surface 34 of the brush holder 14 by the force applied by means of a compression spring 36 surrounding the rear portion 38 of the shutter and held in place by the cap 26. Furthermore, a sealing element 40 is provided between the respective side walls of the shutter 22 and the housing 24. This sealing element may be comprised of felt or other type of material.

A circular hole or aperture 42 is formed through the width of the blade shutter 22 intermediate its length where it is in registration with the exposed inner ends of a separated light energy (fiber optic) conductor 44 so that an optical path is completed through the hole 42 when the end 30 of the shutter is in contact with the sides of the brush 12 as shown in FIG. 1. For a worn condition of the brush 12 as shown in the phantom lines, the action of the bias spring 36 pushes the nose portion 28 into the interior of the brush holder 14. When this occurs, the hole or aperture 42 moves to the left as shown in FIG. 1, thereby blocking the light path in the fiber optic conductor 44 from an emitter 46 to a detector 48 as shown in FIG. 4.

Referring briefly to FIG. 4, what is intended to be shown in a suitable environment and use of the detector assembly of the present invention. Light from a suitable source or emitter 46 is provided, by a light path including a fiber optic light conductor 4, to detector 48. Conductor 44 has a discontinuity defining a gap bounded by exposed conductor ends 43 and 45. Blade shutter 22 is disposed within this gap. In a first operational mode, an unworn brush retains the blade shutter in the position shown such that a completed light path exists through aperture 42 in shutter 22. When the brush wears and the shutter is released, aperture 42 moves out of alignment with the ends 43 and 45, interrupting the light path, which is detected by detector 48 to thus provide an appropriate indication. An alternate mode of operation would be to locate the aperture 42 such that the light path is blocked in the good brush condition and completed when the shutter is released by the worn brush.

Referring now to FIGS. 2 and 3, there is disclosed a second embodiment of the invention and is similar to that shown in FIG. 1 in that it includes a relatively thin blade type of shutter 50 which is located between the exposed ends 52 and 54 of a fiber optic conductor 44 which has been cut or separated but with the exposed ends 52 and 54 being in mutual registration and opposing one another. The separated ends 56 and 58 of the fiber optic conductor 44 are held in place by a pair of termination members 60 and 62 which are secured to two side portions 64 and 66 of a housing 68 which includes an interior space containing the shutter member 50 and a bias spring 72 as shown in FIG. 3.

Referring to FIG. 3, the bias spring 72 comprises a metal clip which fits around the back inner wall surface 74 and two adjoining semi-circular recesses 76 and 78. The spring clip 72 includes a finger portion 80 which contacts the back wall surface 82 of the blade member 50 and in so doing, urges the blade member to the right as shown in FIG. 3. It includes a rounded end nose portion 84 which is also adapted to contact the side of the brush 12. The body of the shutter 50 also includes a circular aperture or hole 86 intermediate its length which is adapted to be in registration with the location of the exposed ends 52 and 54 of the fiber optic conductor 44. In FIG. 3, the blade member 50 is shown projecting into the brush holder 14 behind the brush 12. This constitutes a worn condition of the brush 12 and accordingly the aperture 86 has moved laterally to the right causing the light path through the fiber optic conductor to be interrupted. Once again, as discussed with respect to FIG. 4, the asesmbly could be designed to utilize a completed light path to indicate a worn brush.

While the embodiments of the invention disclose blade type of light interruptors, it should be noted that, when desirable, the light interruptors can take the form of cylindrical type members having a circular cross section. In such a configuration, the fiber optic conductor can be positioned in any desired orientation since the light aperture therethrough would now be a bore through a cylinder as opposed to a hole in a thin flat body member.

Thus what has been shown and described is a fiber optic brush detector including an apertured shutter which is biased against the side of a brush by a compressional bias spring, causing the shutter to move into the brush holder behind the rear end of the brush and in doing so, breaks or alternatively makes, a light path between an emitter and a detector, causing a brush replacement indication to be generated. Such an arrangement furthermore keeps electrical current members associated with the motor away from the brushes.

Having thus shown and described what are at present considered to be the preferred embodiments of the invention, it should be noted that the same have been made by way of illustration and not limitation. For example, while an apertured shutter has been illustrated, other configurations such as notches or other forms of light transmitting/blocking discontinuities could be used with equal facility. Accordingly, all modifications, alterations and changes coming within the spirit and scope of the invention are herein meant to be included.

I claim:

1. A brush wear detector assembly for a dynamoelectric machine comprising, in combination:

a brush holder;

a brush located in said brush holder;

a housing attached to the brush holder and including therein light interruptor means having a body portion operable to interrupt a light path and a discontinuity therein for completing a light path therethrough, and bias spring means contacting said body portion and being operable to force said interruptor means into said brush and against a side of said brush;

a source of light energy and a detector of light energy; and light energy conductor means coupled between said source and said detector having a region of separation at said housing and including a pair of exposed inner ends on either side of said body portion, said discontinuity being in registration with said exposed inner ends for a first condition of wear of said brush and out of registration therewith due to a lateral movement of said body portion behind the rear of said brush due to a second condition of wear, thereby altering the conductive condition through said conductor and causing a signal of said worn condition to be generated.

2. The brush wear detector assembly as defined by claim 1 wherein said light energy conductor means comprises fiber optic conductor means.

3. The brush wear detector assembly as defined by claim 1 wherein said bias spring means comprises a compression spring.

4. The brush wear detector assembly as defined by claim 3 wherein said compression spring contacts a rear surface of said body portion.

5. The brush wear detector assembly as defined by claim 3 wherein said body portion includes a front end portion contacting the side of said brush for a usable condition thereof and a shoulder section behind the front end portion which abuts said brush holder to limit the movement of said body portion into said brush holder for a worn condition of said brush.

6. The brush wear detector assembly as defined by claim 5 wherein said front end portion includes a rounded nose portion.

7. The brush wear detector assembly as defined by claim 6 wherein said body portion comprises a relatively thin flat planar member.

8. The brush wear detector assembly as defined by claim 1 wherein said body portion of said light interruptor means comprises an elongated body member having generally flat planar sides and wherein said discontinuity comprises an aperture formed through said sides at a predetermined location intermediate the front and rear ends thereof.

9. The brush wear detector assembly as defined by claim 8 wherein said spring means comprises a compression spring contacting the rear of said body member.

10. The brush wear detector assembly as defined by claim 9 wherein said housing additionally includes an end cap member threadably fastened to said housing for holding said compression spring in place against the body member.

11. The brush wear detector assembly as defined by claim 10 and additionally including means between said body member and said housing for providing a frictional seal therebetween.

12. The brush wear detector assembly as defined by claim 1 wherein said bias spring means comprises a spring clip located in said housing behind said body portion.

13. The brush wear detector assembly as defined by claim 12 wherein said housing includes a recess located behind said body portion, said recess being formed to conform to the shape of said spring clip.

14. The brush wear detector assembly as defined by claim 13 and wherein said spring clip includes a reversely bent body portion terminating in an end portion contacting the body portion of said light interruptor.

15. The brush wear detector assembly as defined by claim 14 wherein said spring clip additionally includes a reversely bent end portion at the opposite end of the clip.

* * * * *